US012631127B2

(12) United States Patent
Takakusagi et al.

(10) Patent No.: US 12,631,127 B2
(45) Date of Patent: May 19, 2026

(54) SOUNDPROOF WALL AND STEAM TURBINE

(71) Applicant: MITSUBISHI HEAVY INDUSTRIES, LTD., Tokyo (JP)

(72) Inventors: Tomohiko Takakusagi, Tokyo (JP); Yasuyuki Tatsumi, Tokyo (JP); Noriyuki Takeda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 133 days.

(21) Appl. No.: 18/705,005

(22) PCT Filed: Oct. 28, 2022

(86) PCT No.: PCT/JP2022/040460
§ 371 (c)(1),
(2) Date: Apr. 26, 2024

(87) PCT Pub. No.: WO2023/105985
PCT Pub. Date: Jun. 15, 2023

(65) Prior Publication Data

US 2025/0270941 A1 Aug. 28, 2025

(30) Foreign Application Priority Data

Dec. 6, 2021 (JP) ................................ 2021-197506

(51) Int. Cl.
*F01D 25/24* (2006.01)
*F01D 25/04* (2006.01)

(52) U.S. Cl.
CPC ............ *F01D 25/24* (2013.01); *F01D 25/04* (2013.01); *F05D 2260/96* (2013.01)

(58) Field of Classification Search
CPC .......... F01D 25/00; F01D 25/24; F01D 25/04; F05D 2260/96
See application file for complete search history.

(56) References Cited

U.S. PATENT DOCUMENTS 7,383,918 B1 6/2008 Sitko
7,866,440 B2 * 1/2011 Douglas ................. F02C 7/045 181/292

(Continued)

FOREIGN PATENT DOCUMENTS

CN 207960695 U * 10/2018
EP 2583823 A1 * 4/2013 ............ B32B 25/08

(Continued)

OTHER PUBLICATIONS

Harada, Shigeru, "Sound Insulation Structure Near Ground Portion In Low-Pressure Steam Turbine", JP 2003-254008A, JPO, Machine Translation, Sep. 10, 2003 (Year: 2003).*

(Continued)

*Primary Examiner* — Nathaniel E Wiehe
*Assistant Examiner* — Joshua R Beebe
(74) *Attorney, Agent, or Firm* — WHDA, LLP

(57) ABSTRACT

This soundproof wall is provided with: a frame disposed in an annular space on the outer circumferential side of a rotary shaft; a sound absorbing material supported by the frame; and a movement restricting member for restricting movement of the sound absorbing material toward an axial noise-source side which is the side on which a noise source exists. The frame is provided with a support plate part that extends circumferentially and spreads radially; an outer circumferential plate part that extends from a radial outer end of the support plate part toward the axial noise-source side and extends circumferentially, and an inner circumferential plate part that extends from a radial inner end of the support plate part toward the axial noise-source side and that extends circumferentially. The sound absorbing material is stored in a sound absorbing material storage space demarked by the support plate part, the outer circumferential plate part, and the inner circumferential plate part. The movement (Continued)

restricting member has a sound absorbing material pressing member that comes into contact with the sound absorbing material only at a position away from the outer and inner circumferential plate parts and that cannot move relatively to the support plate part in the axial direction.

12 Claims, 7 Drawing Sheets

(56) References Cited

U.S. PATENT DOCUMENTS

| | | | | |
|---|---|---|---|---|
| 10,465,707 | B2 * | 11/2019 | Care | F02C 7/045 |
| 2005/0082112 | A1 * | 4/2005 | Harrison | F02K 1/827 181/210 |
| 2018/0030853 | A1 | 2/2018 | Merchant et al. | |
| 2020/0232417 | A1 * | 7/2020 | Kunimoto | F01K 13/006 |

FOREIGN PATENT DOCUMENTS

| | | | |
|---|---|---|---|
| JP | 2003-104300 | A | 4/2003 |
| JP | 2003-254008 | A | 9/2003 |
| JP | 3513366 | B2 | 3/2004 |
| JP | 2015-113726 | A | 6/2015 |
| JP | 2016-212263 | A | 12/2016 |
| JP | 2017-150449 | A | 8/2017 |
| JP | 2019006199 | A * | 1/2019 |

OTHER PUBLICATIONS

Umemura, Sunao, et al. "Combustor", JP 351336 B2, JPO, Mar. 31, 2004 (Year: 2004).*

International Search Report dated Dec. 6, 2022, issued in counterpart International application No. PCT/JP2022/040460, with English translation. (4 pages).

Written Opinion dated Dec. 6, 2022, issued in counterpart International application No. PCT/JP2022/040460, with English translation. (9 pages).

* cited by examiner

SOUNDPROOF WALL AND STEAM TURBINE

TECHNICAL FIELD

The present disclosure relates to a soundproof wall and a steam turbine.

This application claims the priority of Japanese Patent Application No. 2021-197506 filed in Japan on Dec. 6, 2021, the content of which is incorporated herein by reference.

BACKGROUND ART

PTL 1 discloses a sound insulating structure in the vicinity of a gland portion of a low-pressure steam turbine. In the sound insulating structure in PTL 1, a sound insulating plate is provided on an external space side of the gland portion to block high-frequency noise generated by vibration of a bellows which is generated due to a flow of gland steam flowing from the gland portion to a space part on a bellows side. The sound insulating plate in PTL 1 includes a soundproof material, and a punching metal and a cover which are disposed to sandwich the soundproof material. The cover is fixed to an outer casing, whereby the sound insulating plate is supported by the outer casing.

CITATION LIST

Patent Literature

[PTL 1] Japanese Unexamined Patent Application Publication No. 2003-254008

SUMMARY OF INVENTION

Technical Problem

In the sound insulating structure disclosed in PTL 1, the punching metal is disposed on the bellows side which is a noise-source with respect to a sound absorbing material, and the punching metal is supported by a cover. Therefore, when the punching metal vibrates due to noise from the bellows, the vibration is transmitted to the cover, and there is a problem in that desired soundproof performance may not be obtained.

The present disclosure is made in view of the above-described circumstances, and provides a soundproof wall and a steam turbine which can improve soundproof performance.

Solution to Problem

In order to solve the above-described problem, the following configurations are adopted.

According to an aspect of the present disclosure, there is provided a soundproof wall disposed in an annular space on an outer peripheral side of a rotary shaft rotatable around an axis. The soundproof wall includes a frame disposed in the annular space, a sound absorbing material supported by the frame, and a movement restricting member that restricts movement of the sound absorbing material to an axial noise-source side which is side of a noise-source, out of both sides in an axial direction in which the axis extends. The frame includes a support plate part extending in a circumferential direction around the axis and spreading in a radial direction around the axis, an outer peripheral plate part extending from an outer end of the support plate part in the radial direction toward the axial noise-source side and extending in the circumferential direction, and an inner peripheral plate part extending from an inner end of the support plate part in the radial direction toward the axial noise-source side and extending in the circumferential direction. The sound absorbing material is accommodated in a sound absorbing material accommodating space partitioned by the support plate part, the outer peripheral plate part, and the inner peripheral plate part. The movement restricting member includes a sound absorbing material pressing member that comes into contact with the sound absorbing material only at a position away from the outer peripheral plate part and the inner peripheral plate part, and that is relatively immovable with respect to the support plate part in the axial direction.

According to another aspect of the present disclosure, there is provided a steam turbine including a steam turbine rotor rotatable around an axis, a steam turbine casing disposed on an outer peripheral side of the steam turbine rotor, a gland portion that seals a periphery of the steam turbine rotor, a bellows portion that closes a portion between the gland portion and the steam turbine casing while allowing a relative displacement between the gland portion and the steam turbine casing in the axial direction in which the axis extends, and the soundproof wall disposed in an annular space on the outer peripheral side of the steam turbine rotor serving as a rotary shaft.

Advantageous Effects of Invention

According to the above-described soundproof wall and the above-described steam turbine, soundproof performance can be improved.

DESCRIPTION OF EMBODIMENTS

Next, a soundproof wall and a steam turbine according to an embodiment of the present disclosure will be described with reference to the drawings.

<<Configuration of Steam Turbine>>

Figure 1:
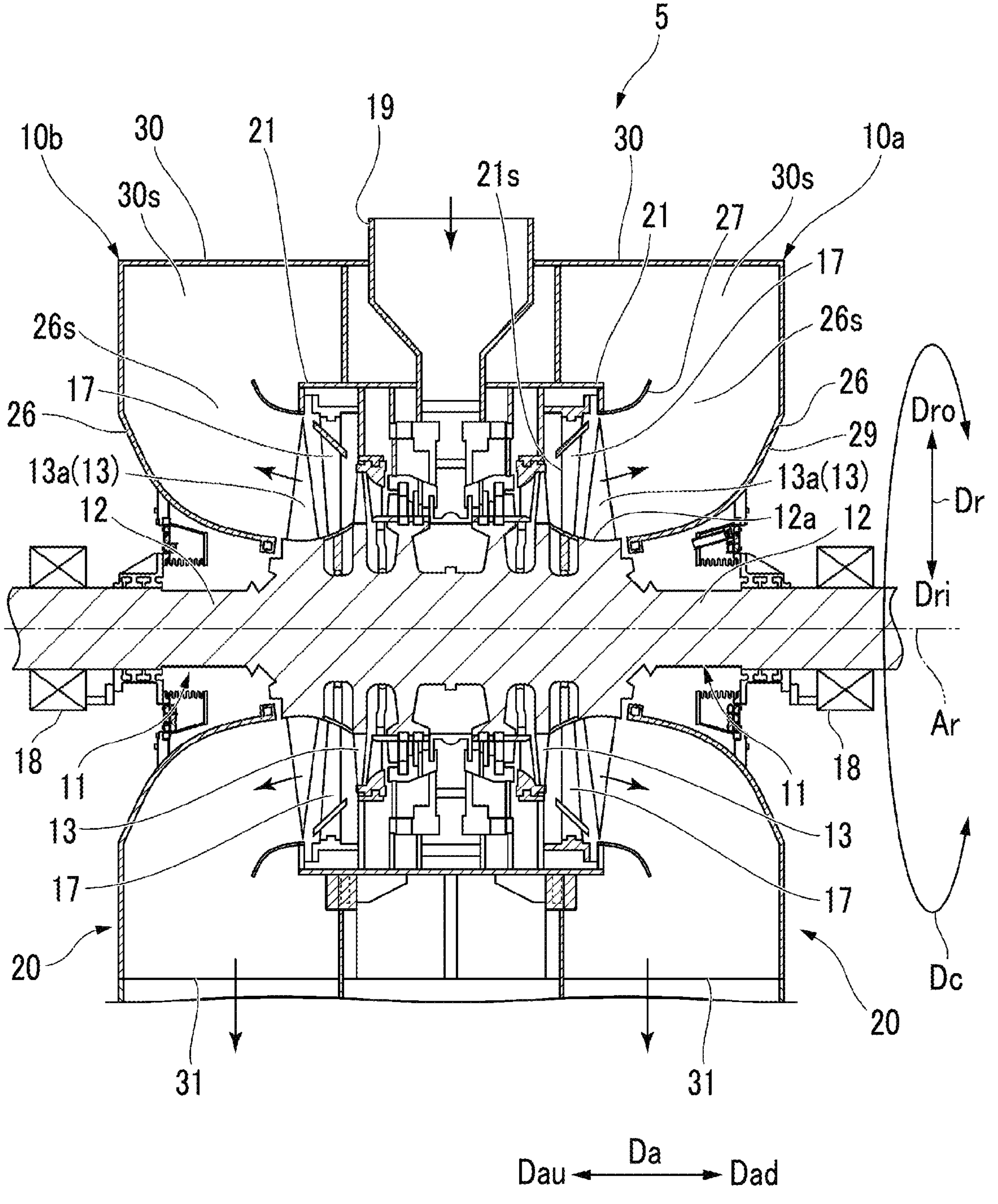
FIG. 1 is a view illustrating a configuration of a steam turbine according to an embodiment of the present disclosure.
Figure 2:
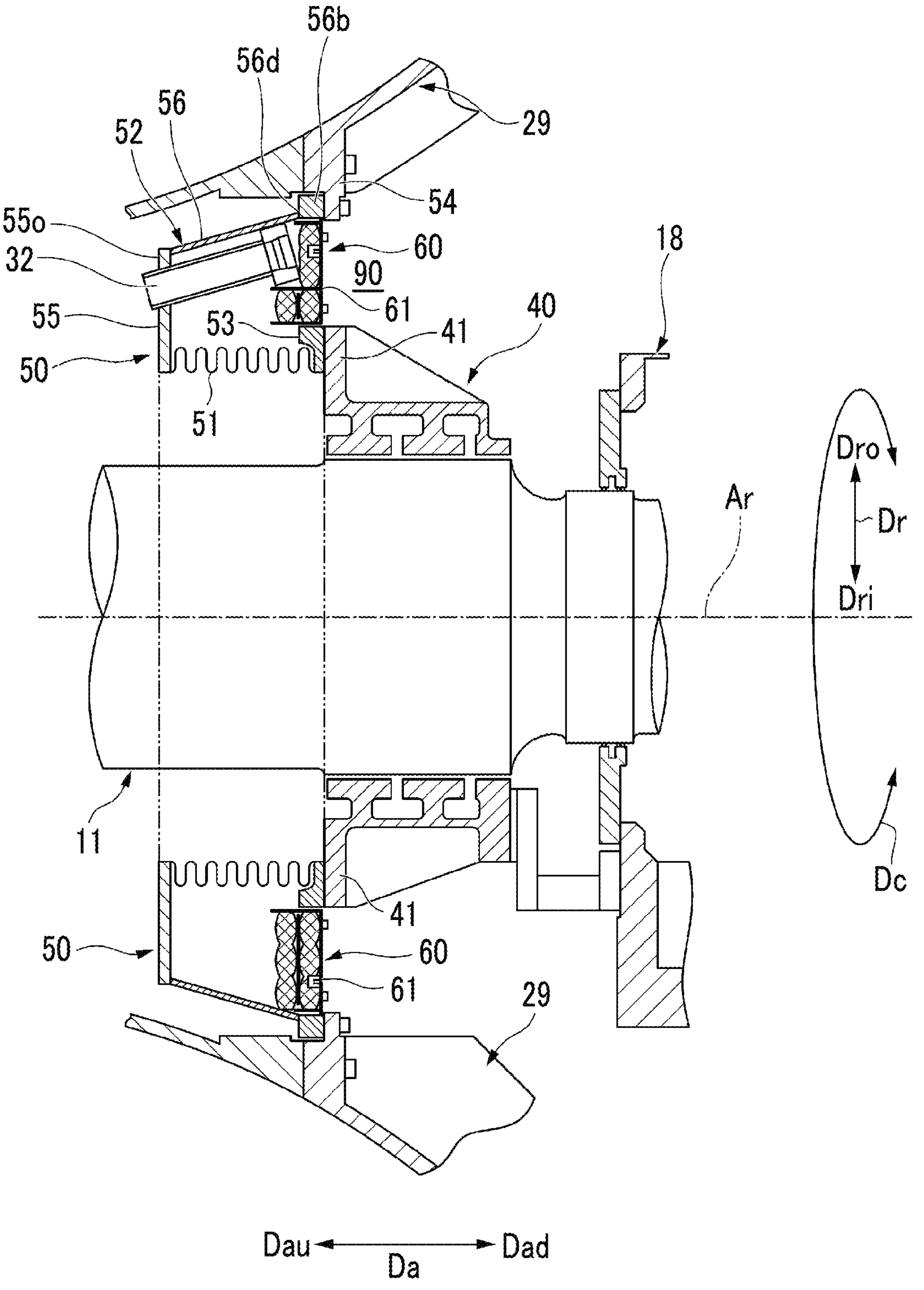
FIG. 2 is an enlarged view illustrating the vicinity of a gland portion of the steam turbine in the embodiment of the present disclosure.

As illustrated in FIGS. 1 and 2, a steam turbine 5 is a so-called two-way flow dividing exhaust type steam turbine, and includes a first steam turbine unit 10*a* and a second steam turbine unit 10*b*. Both the first steam turbine unit 10*a* and the second steam turbine unit 10*b* include a turbine rotor (rotary shaft and steam turbine rotor) 11 rotating around an axis Ar, a casing (steam turbine casing) 20 that covers the turbine rotor 11, a plurality of stator blade rows 17 fixed to the casing 20, a steam inlet duct 19, a gland portion 40 that seals a periphery of the turbine rotor 11, a bellows portion 50 that closes a portion between the gland portion 40 and the casing 20, and a soundproof wall 60 disposed in an annular space 90 on an outer peripheral side of the turbine rotor 11. In the following description, a circumferential direction around the axis Ar will be simply referred to as a circumferential direction Dc, and a direction perpendicular to the axis Ar will be referred to as a radial direction Dr. Furthermore, in the radial direction Dr, a side on the axis Ar will be referred to as a radial inner side Dri, and a side opposite to the radial inner side Dri will be referred to as a radial outer side Dro. In addition, a configuration of the first steam turbine unit 10*a* and a configuration of the second steam turbine unit 10*b* are essentially the same as each other. Therefore, in the following description, the first steam turbine unit 10*a* will be mainly described, and detailed description of the second steam turbine unit 10*b* will be omitted.

The turbine rotor 11 includes a rotor shaft 12 extending in an axial direction Da around the axis Ar, and a plurality of rotor blade rows 13 attached to the rotor shaft 12. The turbine rotor 11 is supported to be rotatable around the axis Ar by a bearing 18. The plurality of rotor blade rows 13 are aligned in the axial direction Da. Any of the rotor blade rows 13 is configured to include a plurality of rotor blades aligned in the circumferential direction Dc. The turbine rotor 11 of the first steam turbine unit 10*a* and the turbine rotor 11 of the second steam turbine unit 10*b* are located on the same axis Ar, are connected to each other, and integrally rotate around the axis Ar.

The casing 20 includes an inner casing 21 and an outer casing 30.

The inner casing 21 forms a first space 21*s* that forms an annular shape around the axis Ar, between the rotor shaft 12 and the inner casing 21. Steam (fluid) flowing from the steam inlet duct 19 flows through the first space 21*s* in the axial direction Da (more specifically, toward an axial downstream side Dad). The plurality of rotor blade rows 13 of the turbine rotor 11 are disposed inside the first space 21*s*. The plurality of stator blade rows 17 are aligned inside the first space 21*s* along the axial direction Da. Each of the plurality of stator blade rows 17 is disposed on an axial upstream side Dau of any one rotor blade row 13 in the plurality of rotor blade rows 13. The plurality of stator blade rows 17 are fixed to the inner casing 21.

The outer casing 30 surrounds the turbine rotor 11 and the inner casing 21, and forms a second space 30*s* for discharging the steam flowing through the first space 21*s* between the inner casing 21 and the outer casing 30. The second space 30*s* communicates with a diffuser 26, and is formed on an outer peripheral side of the diffuser 26. The outer casing 30 guides the steam flowing from a diffuser space 26*s* into the second space 30*s*, to an exhaust port 31.

The outer casing 30 includes then exhaust port 31 on a first side (lower side in FIG. 1) in a direction orthogonal to the axis Ar. The outer casing 30 described as an example in the embodiment is open in a vertically downward direction. The steam turbine 5 of the embodiment is a so-called downward exhaust type condensing steam turbine, and a condenser (not illustrated) for converting the steam back to water is connected to the exhaust port 31.

The diffuser 26 is disposed on the axial downstream side Dad of the inner casing 21, and allows the first space 21*s* and the second space 30*s* to communicate with each other. The diffuser 26 forms an annular diffuser space 26*s* gradually facing the radial outer side Dro as the diffuser 26 faces the axial downstream side Dad. In the diffuser space 26*s*, the steam flowing out from a rotor blade row 13*a* disposed most downstream on the axial downstream side Dad of the turbine rotor 11 toward the axial downstream side Dad flows into the diffuser space 26*s*.

The diffuser 26 includes an outer diffuser 27 that defines an edge of the radial outer side Dro of the diffuser space 26*s*, and an inner diffuser 29 that defines an edge of the radial inner side Dri of the diffuser space 26*s*.

The outer diffuser 27 has a tubular shape extending from an end edge of the inner casing 21 on the axial downstream side Dad toward the axial downstream side Dad. The outer diffuser 27 has an annular cross section perpendicular to the axis Ar, and a diameter thereof gradually increases as the outer diffuser 27 faces the axial downstream side Dad.

The inner diffuser 29 is formed in a tubular shape extending to the axial downstream side Dad to be continuous with an inner surface 12*a* that defines the radial inner side Dri of the first space 21*s*. The inner diffuser 29 has an annular cross section perpendicular to the axis Ar, and a diameter thereof gradually increases toward the radial outer side Dro as the inner diffuser 29 faces the axial downstream side Dad.

<<Configuration of Gland Portion and Bellows Portion>>

Figure 3:
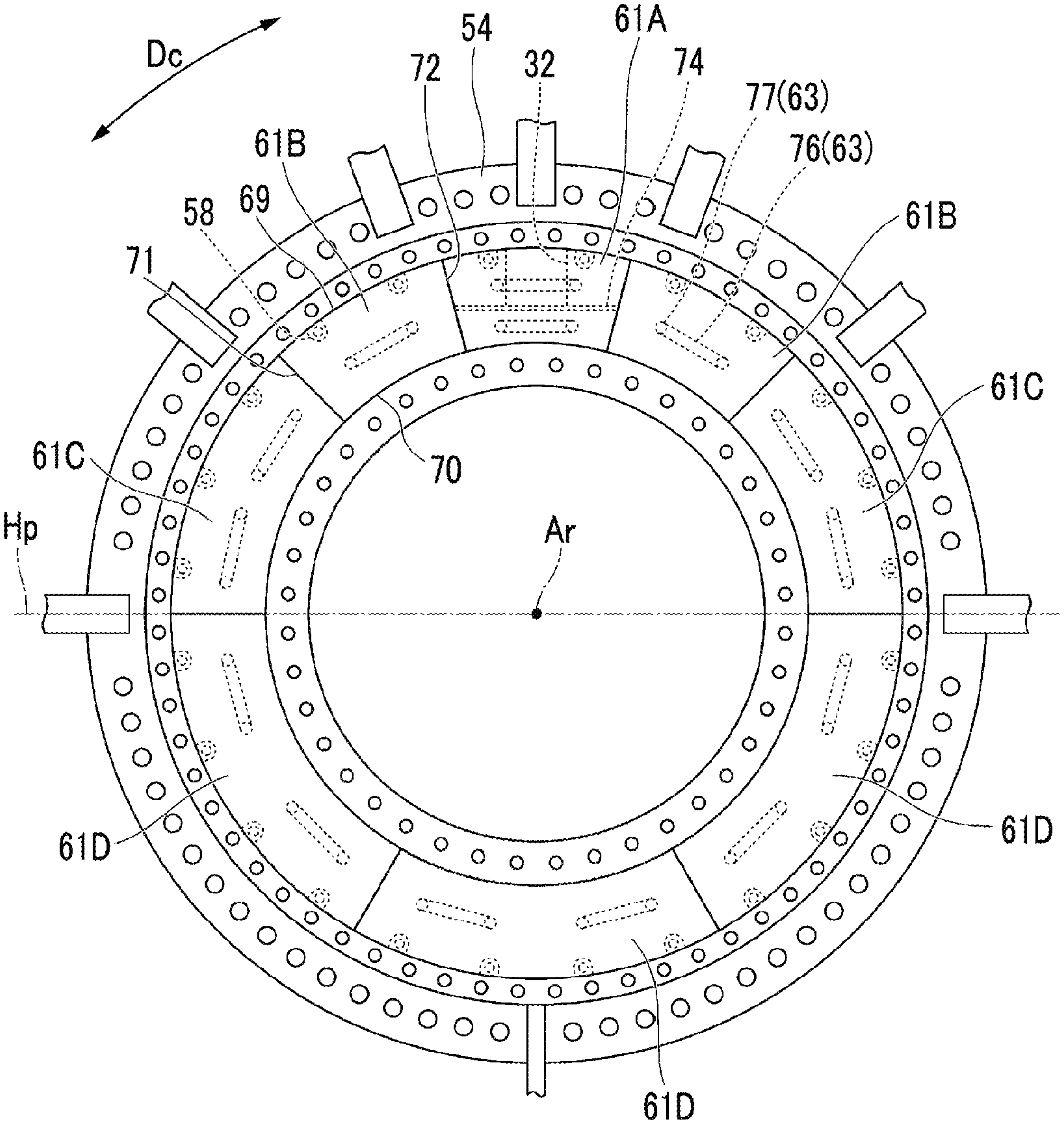
FIG. 3 is a view when a soundproof wall in the embodiment of the present disclosure is viewed from a counter-noise-source side in an axial direction.
Figure 4:
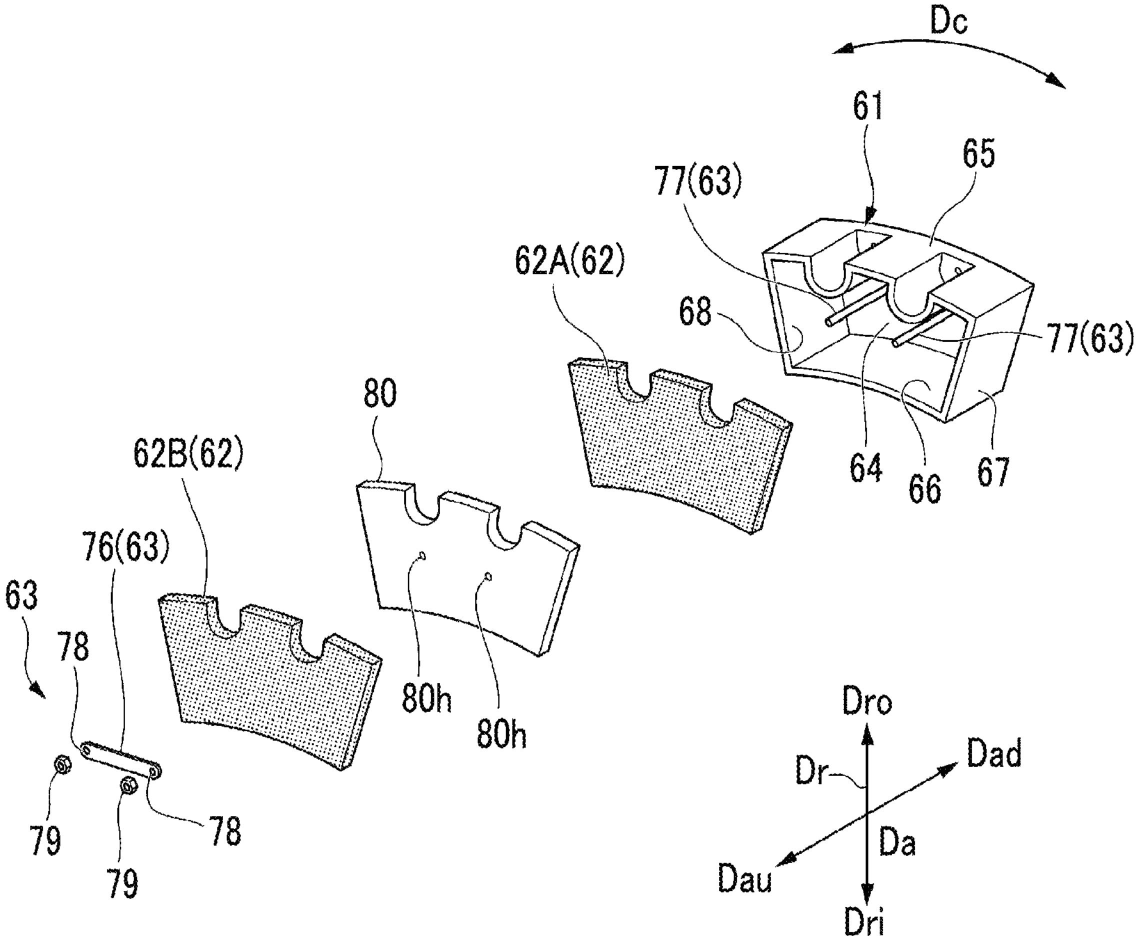
FIG. 4 is an exploded perspective view a part of the soundproof wall in a circumferential direction in the embodiment of the present disclosure.

FIG. 2 is an enlarged view illustrating the vicinity of the gland portion of the steam turbine in the embodiment of the present disclosure. FIG. 3 is a view when the soundproof wall in the embodiment of the present disclosure is viewed from a counter-noise-source side in the axial direction. FIG. 4 is an exploded perspective view of a part of the soundproof wall in the circumferential direction in the embodiment of the present disclosure.

As illustrated in FIGS. 1 and 2, the gland portion 40 is disposed on the radial inner side Dri of the inner diffuser 29. The gland portion 40 is formed in an annular shape that surrounds an entire periphery of the turbine rotor 11 from the outer peripheral side. The gland portion 40 of the present embodiment is supported by a bearing box that accommodates the bearing 18. The bearing box has an anchor point in the axial direction Da, and cannot be displaced in the axial direction Da. In this manner, the gland portion 40 of the present embodiment cannot be displaced around the axis Ar and in the axial direction Da. A gap is formed between the gland portion 40 and the turbine rotor 11 in the radial direction Dr. The steam is supplied to the gland portion 40 from the outside, and the steam flows into the gap between the gland portion 40 and the turbine rotor 11 from an inner peripheral side of the gland portion 40. The steam supplied to the gap between the gland portion 40 and the turbine rotor 11 flows from the gap into the axial upstream side Dau and the axial downstream side Dad. In this way, the gland portion 40 prevents the steam from flowing out to the outside of the steam turbine 5. The gland portion 40 includes a gland flange 41 for fixing the bellows portion 50 to an end portion on the axial upstream side Dau. The gland flange 41 extends toward the radial outer side Dro, and extends in the circumferential direction Dc to form an annular shape.

Figure 5:
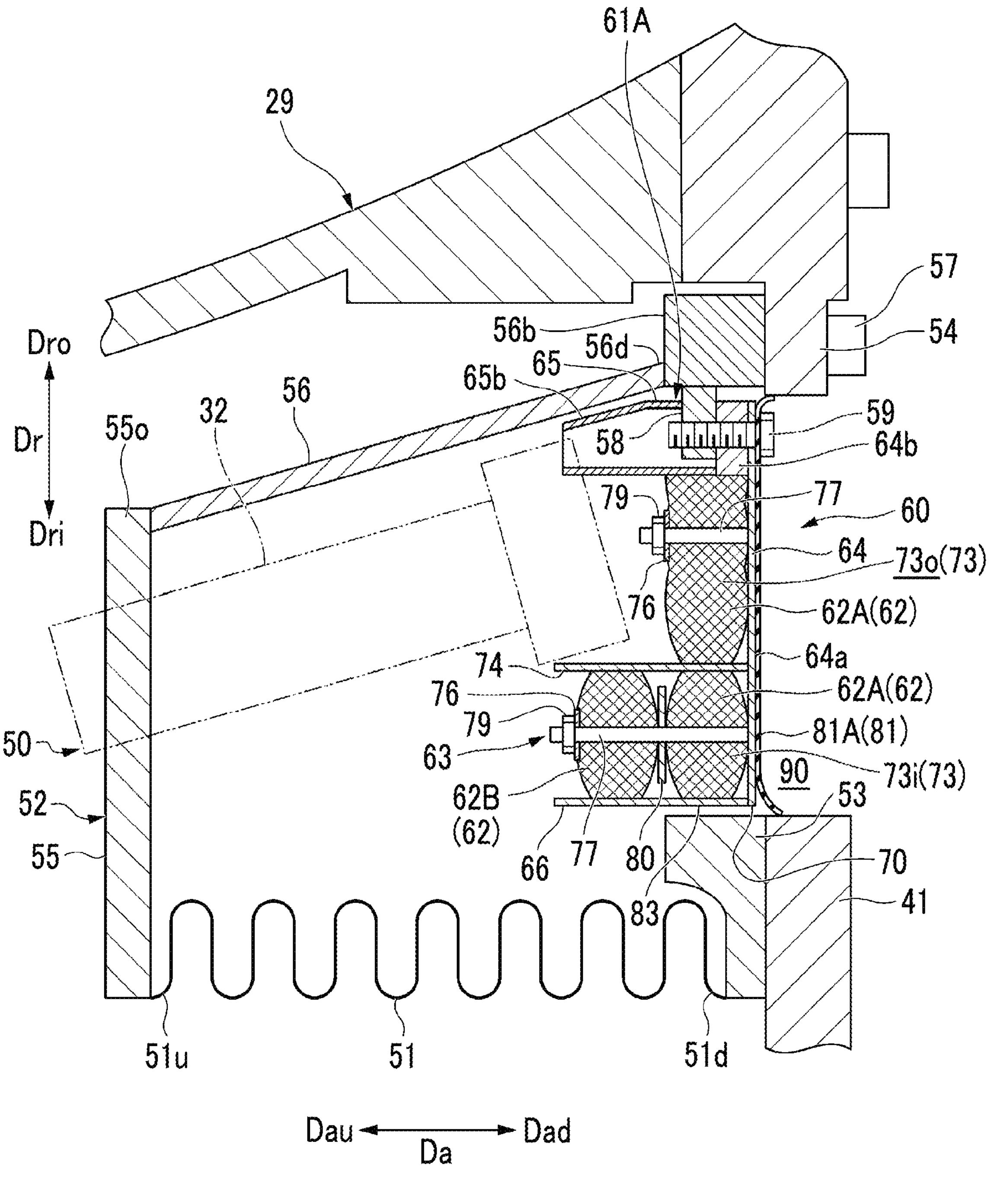
FIG. 5 is a sectional view including an axis of a first frame in frames in the embodiment of the present disclosure.
Figure 6:
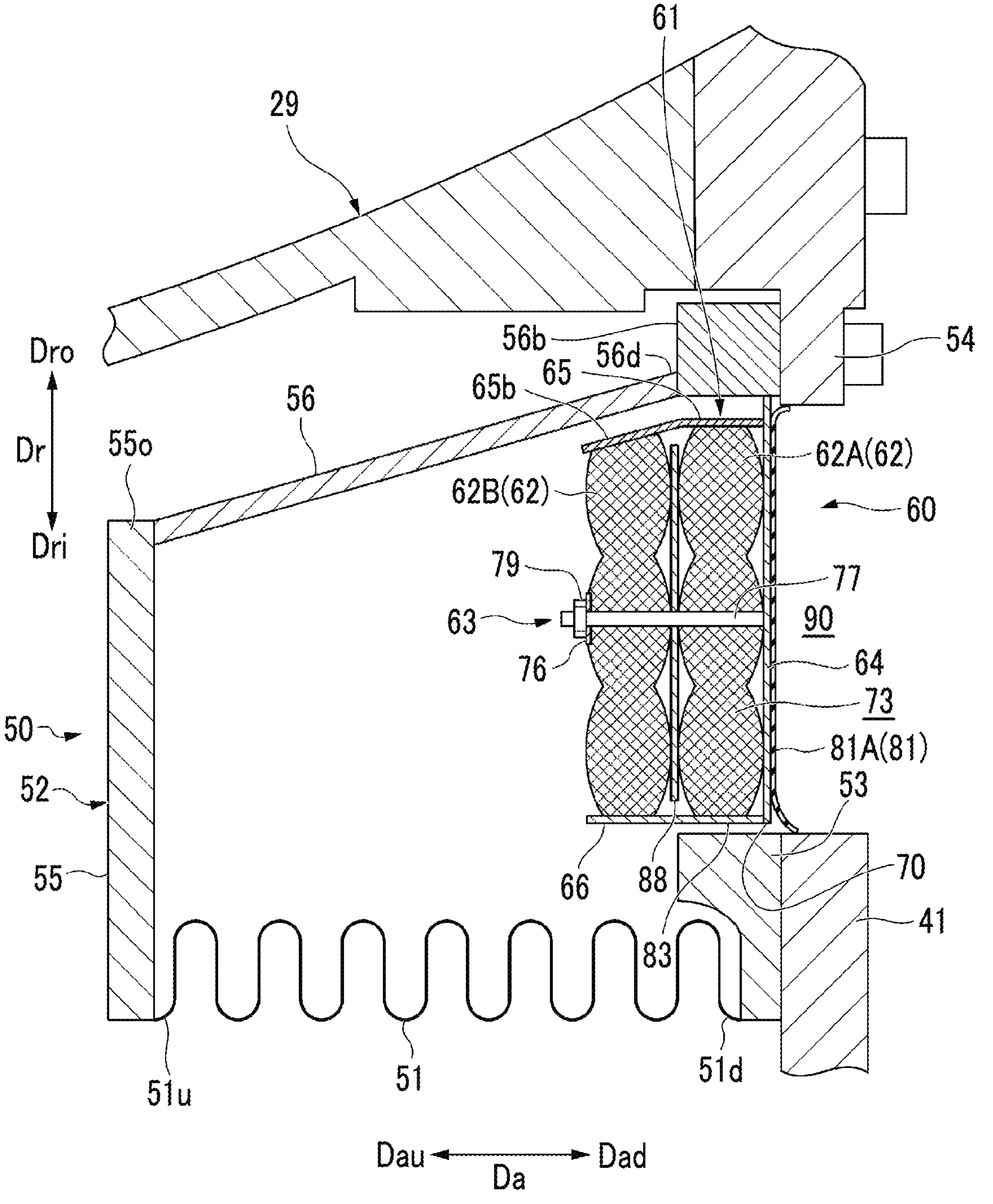
FIG. 6 is a sectional view including an axis of another frame other than the first frame in the frames in the embodiment of the present disclosure.

FIG. 5 is a sectional view including an axis of a first frame in frames in the embodiment of the present disclosure. FIG. 6 is a sectional view including an axis of another frame other than the first frame in the frames in the embodiment of the present disclosure.

As illustrated in FIG. 2, FIG. 5, and FIG. 6, the bellows portion 50 closes a portion between the gland portion 40 and the casing 20 while allowing a relative displacement between the gland portion 40 and the casing 20 in the axial direction Da. The bellows portion 50 includes a bellows body portion 51, a bellows support portion 52, and an inner bellows portion flange 53. An assembly of the gland portion 40 and the bellows portion 50 can also be referred to as a shaft sealing device.

The bellows body portion 51 is disposed to be separated from the turbine rotor 11 to the radial outer side Dro, and covers the turbine rotor 11 from the outer peripheral side. The bellows body portion 51 elastically deforms so that a length dimension in the axial direction Da is variable. The bellows body portion 51 described as an example in the present embodiment is a pipe having a bellows structure extending in the axial direction Da. An end portion 51*d* on the axial downstream side Dad of the bellows body portion 51 is fixed to the ring-shaped inner bellows portion flange 53, and is fixed to the above-described gland flange 41 via the inner bellows portion flange 53. The inner bellows portion flange 53 and the gland flange 41 can be fixed by a fastener (not illustrated) such as a bolt from the axial downstream side Dad of the gland flange 41 in a state where the inner bellows portion flange 53 is brought into contact with the gland flange 41 from the axial upstream side Dau. A portion of the steam ejected from the gland portion 40 collides with the bellows body portion 51 of the present embodiment. In this manner, the bellows body portion 51 vibrates, and generates high-frequency noise. That is, the bellows body portion 51 is a noise-source.

The bellows support portion 52 extends to the radial outer side (outer peripheral side) Dro from an end portion 51*u* on the axial upstream side Dau opposite to the gland portion 40 of the bellows body portion 51, and is connected to a flange portion 54 formed in the casing 20. In other words, the bellows support portion 52 supports the end portion 51*u* on the axial upstream side Dau of the bellows body portion 51 from the radial outer side Dro. Here, the flange portion 54 described as an example in the present embodiment is disposed at the same position as that of the gland flange 41 in the axial direction Da, and is disposed to be separated to the radial outer side Dro of the gland flange 41. The flange portion 54 is formed in an annular shape protruding from the inner diffuser 29 to the radial inner side Dri.

The bellows support portion 52 includes a first support portion 55 and a second support portion 56.

The first support portion 55 is formed in an annular shape extending to the radial outer side Dro from the end portion 51*u* on the axial upstream side Dau of the bellows body portion 51 and extending in the circumferential direction Dc. The first support portion 55 of the present embodiment is formed in a flat plate shape extending in a direction perpendicular to the axis Ar, and an end portion 550 on the radial outer side Dro of the first support portion 55 is separated to the radial inner side Dri from the inner diffuser 29.

The second support portion 56 extends along the inner diffuser 29 from the end portion 550 on the radial outer side Dro of the first support portion 55. In other words, the second support portion 56 is formed in a tubular shape whose diameter gradually increases toward the axial downstream side Dad. An outer bellows portion flange 56*b* for fixing is formed in an end portion 56*d* on the axial downstream side Dad of the second support portion 56, and the outer bellows portion flange 56*b* is fixed to the flange portion 54 of the above-described casing 20. The outer bellows portion flange 56*b* and the flange portion 54 which are described as examples in the present embodiment can be fixed by a fastener 57 such as a bolt from the axial downstream side Dad of the flange portion 54 in a state where the outer bellows portion flange 56*b* is brought into contact with the flange portion 54 from the axial upstream side Dau.

The bellows portion 50 is configured as described above, and seals a portion between the flange portion 54 of the casing 20 and the gland flange 41 of the gland portion 40 while allowing a relative displacement between the flange portion 54 and the gland flange 41 in the axial direction Da and the radial direction Dr. The outer bellows portion flange 56*b* of the bellows portion 50 includes a plurality of protrusion portions 58 protruding toward the radial inner side Dri. As illustrated in FIG. 3, the plurality of protrusion portions 58 are disposed at an interval in the circumferential direction Dc. As illustrated in FIG. 5, the soundproof wall 60 is fixed to the protrusion portions 58 from the axial downstream side Dad by a fastener 59 such as a bolt.

<<Configuration of Soundproof Wall>>

As illustrated in FIG. 2, the soundproof wall 60 is disposed in the annular space 90 on the outer peripheral side of the turbine rotor 11 which is a rotary shaft. In other words, the soundproof wall 60 is disposed on the outer peripheral side of the gland portion 40, on the outer peripheral side of the bellows body portion 51, and on the inner peripheral side of the second support portion 56 of the bellows support portion 52. The soundproof wall 60 reduces noise transmitted in the axial direction Da in the annular space 90. The soundproof wall 60 is formed in an annular shape which is slightly smaller than the annular space 90 when viewed in the axial direction Da. As illustrated in FIGS. 5 and 6, the soundproof wall 60 includes a frame 61, a sound absorbing material 62, a sound insulating plate material 80, a movement restricting member 63, and a vibration isolating sheet 81. The frame 61 of the present embodiment is disposed in the annular space 90, and supports the sound absorbing material 62. The frame 61 includes a support plate part 64, an outer peripheral plate part 65, an inner peripheral plate part 66, a first side plate part (side plate) 67 (refer to FIG. 4), and a second side plate part (side plate) 68 (refer to FIG. 4). The vibration isolating sheet 81 of the present embodiment includes a first vibration isolating sheet 81A and a second vibration isolating sheet 81B (refer to FIG. 7).

<<Configuration of Frame>>

As illustrated in FIG. 3, a plurality of the frames 61 of the present embodiment are provided, and the plurality of frames 61 are aligned in the circumferential direction Dc to form an annular shape. The soundproof wall 60 of the present embodiment includes a first frame 61A, a second frame 61B, a third frame 61C, and a fourth frame 61D as the plurality of frames 61. The first frame 61A, the second frame 61B, the third frame 61C, and the fourth frame 61D each have different length dimensions in the circumferential direction Dc.

As illustrated in FIGS. 2 to 4, each of the first frame 61A, the second frame 61B, the third frame 61C, and the fourth frame 61D includes the support plate part 64, the outer peripheral plate part 65, and the inner peripheral plate part 66, and further includes a first side plate part 67 and a second side plate part 68. In the following description, when configurations common to the first frame 61A, the second frame 61B, the third frame 61C, and the fourth frame 61D are described, all of these will be simply referred to as the frame 61 without being distinguished from each other. FIG. 4 illustrates a partially simplified shape of the frame 61.

The support plate part 64 is formed in a plate shape extending in the circumferential direction Dc and spreading in the radial direction Dr. The support plate part 64 of the present embodiment includes an arc-shaped outer peripheral edge 69 extending in the circumferential direction Dc along the flange portion 54 when viewed in the axial direction Da, an arc-shaped inner peripheral edge 70 extending along the gland flange 41, a linear first side edge 71 extending in the radial direction Dr on a first side in the circumferential direction Dc, and a linear second side edge 72 extending in the radial direction Dr on a second side in the circumferential direction Dc. A boss 64*b* (refer to FIG. 5) fixed to the above-described protrusion portion 58 by the fastener 59 is provided in the vicinity of the outer peripheral edge 69 of the support plate part 64. The boss 64*b* is disposed on the axial downstream side Dad of the fastener 59.

The outer peripheral plate part 65 extends from an end on the radial outer side Dro of the support plate part 64 toward the axial upstream side (axial noise-source side) Dau, and extends in the circumferential direction Dc. More specifically, the outer peripheral plate part 65 extends from an entire region of the outer peripheral edge 69 of the support plate part 64 toward the axial upstream side Dau, and is formed in an arc shape having the same radius of curvature as that of the outer peripheral edge 69 of the support plate part 64 when viewed in the axial direction Da. In the present embodiment, the length dimension of the outer peripheral plate part 65 in the axial direction Da is larger than the length dimension of the outer bellows portion flange 56*b* in the axial direction Da, and for example, is approximately twice as large. In the outer peripheral plate part 65 of the present embodiment, a portion facing the second support portion 56 of the bellows portion 50 in the radial direction Dr includes an inclined portion 65*b* facing the radial inner side Dri as the portion faces the axial upstream side Dau (refer to FIGS. 5 and 6).

The inner peripheral plate part 66 extends from an inner end of the support plate part 64 in the radial direction Dr toward the axial upstream side Dau, and extends in the circumferential direction Dc. More specifically, the inner peripheral plate part 66 extends from an entire region of the inner peripheral edge 70 of the support plate part 64 toward the axial upstream side Dau, and is formed in an arc shape having the same radius of curvature as that of the inner peripheral edge 70 of the support plate part 64 when viewed in the axial direction Da. A sound absorbing material accommodating space 73 (refer to FIGS. 5 and 6) is formed between the outer peripheral plate part 65 and the inner peripheral plate part 66 in the radial direction Dr. In the present embodiment, the length dimension of the inner peripheral plate part 66 in the axial direction Da is equal to the length dimension of the outer peripheral plate part 65 in the axial direction Da. The inner peripheral plate part 66 is disposed at an interval in the radial direction Dr from the gland flange 41 and the inner bellows portion flange 53 not to come into contact with the gland flange 41 and the inner bellows portion flange 53.

The first side plate part 67 extends from an end on the first side in the circumferential direction Dc of the outer peripheral plate part 65 to the radial inner side Dri, and is connected to an end on the first side in the circumferential direction Dc of the inner peripheral plate part 66. The first side plate part 67 is also connected to a first side edge (end) 71 on the first side in the circumferential direction Dc of the support plate part 64. The first side plate part 67 of the present embodiment is formed in a flat plate shape, and has a rectangular shape when viewed in the circumferential direction Dc.

The second side plate part 68 extends from an end on the second side in the circumferential direction Dc of the outer peripheral plate part 65 to the radial inner side Dri, and is connected to an end on the second side of the inner peripheral plate part 66 in the circumferential direction Dc. The second side plate part 68 is also connected to a second side edge (end) 72 on the second side in the circumferential direction Dc of the support plate part 64. The second side plate part 68 of the present embodiment is formed symmetrically with the first side plate part 67 in the circumferential direction Dc, has a flat plate shape, and has the same rectangular shape as that of the first side plate part 67 when viewed in the circumferential direction Dc. The sound absorbing material accommodating space 73 in the present embodiment is partitioned by the support plate part 64, the outer peripheral plate part 65, the inner peripheral plate part 66, the first side plate part 67, and the second side plate part 68.

As illustrated in FIGS. 2, 3, and 5, the first frame 61A is located at an uppermost position in the annular space 90. In the present embodiment, a pipe 32 for adjusting balance of the turbine rotor 11 is provided immediately on the axial upstream side Dau of the first frame 61A.

Unlike the other frame 61 (refer to FIG. 6), the first frame 61A includes a partition plate part 74 that partitions the sound absorbing material accommodating space 73 in the radial direction Dr. The partition plate part 74 extends from the support plate part 64 toward the axial upstream side Dau, and extends in the circumferential direction Dc. The partition plate part 74 described as an example in the present embodiment has the same length dimension in the axial direction Da as that of the inner peripheral plate part 66, and is formed in a flat plate shape extending in a horizontal direction.

The sound absorbing material accommodating space 73 is divided into two including an outer accommodating space 730 on the radial outer side Dro with respect to the partition plate part 74 and an inner accommodating space 73*i* on the radial inner side Dri with respect to the partition plate part 74. As described above, the reason that the partition plate part 74 is provided only in the first frame 61A is as follows. An end of the pipe 32 on the axial downstream side Dad is disposed in a portion on the radial outer side Dro of the sound absorbing material accommodating space 73. In other words, the partition plate part 74 partitions the sound absorbing material accommodating space 73 into an outer accommodating space 730 in which the pipe 32 is disposed and an inner accommodating space 731 that is not affected by the pipe 32.

As illustrated in FIG. 3, the first frame 61A, the second frame 61B, the third frame 61C, and the fourth frame 61D are each formed to have the same radius of curvature around the axis Ar, and the lengths in the circumferential direction Dc, in other words, angle ranges around the axis Ar in which all of these frames are disposed in the annular space 90 are different from each other. In the present embodiment, one first frame 61A, two second frames 61B, and two third frames 61C are disposed above a horizontal plane Hp including the axis Ar, and three fourth frames 61D are disposed below the horizontal plane Hp. In the present embodiment, as the angle range, a case where the first frame 61A and the second frame 61B are 30 degrees, the third frame 61C is 45 degrees, and the fourth frame 61D is 60 degrees is described as an example. The second frame 61B and the third frame 61C are each aligned in this order on both sides of the first frame 61A in the circumferential direction Dc, and only the fourth frame 61D is disposed below the horizontal plane Hp.

<<Configuration of Sound Absorbing Material>>

As illustrated in FIGS. 2 and 4, the sound absorbing material 62 is accommodated in the sound absorbing material accommodating space 73 of the frame 61. The sound absorbing material 62 is formed of a glass fiber. A plurality of the sound absorbing materials 62 are aligned and accommodated in the sound absorbing material accommodating space 73 in the axial direction Da. In the present embodiment, the plurality of sound absorbing materials 62 include two of a first sound absorbing material 62A disposed on the axial downstream side Dad and a second sound absorbing material 62B disposed on the axial upstream side Dau. In the present embodiment, a case where the first sound absorbing material 62A and the second sound absorbing material 62B in the axial direction Da each have the same thickness dimension is described as an example. In the following description, when it is not necessary to distinguish between the first sound absorbing material 62A and the second sound absorbing material 62B, both of these may be simply referred to as the sound absorbing material 62.

<<Configuration of Sound Insulating Plate Material>>

As illustrated in FIG. 4, the sound insulating plate material 80 is disposed between sound absorbing materials 62 adjacent to each other in the axial direction Da. Specifically, the sound insulating plate material 80 is disposed between the first sound absorbing material 62A and the second sound absorbing material 62B which are adjacent to each other in the axial direction Da. The sound insulating plate material 80 extends in the circumferential direction Dc, and spreads in the radial direction Dr. The sound insulating plate material 80 of the present embodiment is formed in a flat plate shape, and is formed to be slightly smaller than a contour of the sound absorbing material accommodating space 73 when viewed in the axial direction Da. A through-hole 80*h* through which a fixing member 77 penetrates is formed in the sound insulating plate material 80. Examples of a material for forming the sound insulating plate material 80 can include the same metallic material as that of the frame 61.

In the present embodiment, the fixing member 77 extends to be perpendicular to a surface facing the axial direction Da of the sound insulating plate material 80. In addition, although FIG. 4 illustrates a case of two through-holes 80*h*, the number of the through-holes 80*h* is formed in accordance with the number of the fixing members 77 provided in the frames 61 serving as attachment targets. In a state where the fixing member 77 penetrates the through-hole 80*h*, the sound insulating plate material 80 is not in contact with any of the outer peripheral plate part 65, the inner peripheral plate part 66, the first side plate part 67, and the second side plate part 68. In the first frame 61A, the sound insulating plate material 80 is provided only in the inner accommodating space 731 in which the first sound absorbing material 62A and the second sound absorbing material 62B are accommodated.

<<Configuration of Movement Restricting Member>>

As illustrated in FIGS. 4, 5, and 6, the movement restricting member 63 restricts movement of the sound absorbing material 62 to the axial upstream side (axial noise-source side) Dau where the bellows body portion 51 which is a noise-source is disposed, out of both sides in the axial direction Da. The movement restricting member 63 of the present embodiment includes a sound absorbing material pressing member 76, a fixing member 77, and a nut 79.

The sound absorbing material pressing member 76 is relatively immovable in the axial direction Da with respect to the support plate part 64, and comes into contact with the sound absorbing material 62 only at a position away from the outer peripheral plate part 65 and the inner peripheral plate part 66. Furthermore, the sound absorbing material pressing member 76 of the present embodiment comes into contact with the sound absorbing material 62 at a position away from the first side plate part 67 and the second side plate part 68, in addition to the outer peripheral plate part 65 and the inner peripheral plate part 66. The sound absorbing material pressing member 76 of the present embodiment is formed in a rod shape extending straight to be perpendicular to the axis Ar. Through-holes 78 through which the fixing member 77 can penetrate in the axial direction Da are respectively formed near both ends of the sound absorbing material pressing member 76.

The fixing member 77 is fixed to the support plate part 64, and extends from the support plate part 64 toward the axial upstream side Dau. The fixing member 77 described as an example in the present embodiment is formed in a rod shape (in other words, a columnar shape) extending straight in the axial direction Da. As illustrated in FIGS. 5 and 6, the fixing member 77 disposed in the inner accommodating space 731 of the first frame 61A and the fixing member 77 disposed in the sound absorbing material accommodating space 73 of the second frame 61B to the fourth frame 61D each penetrate the first sound absorbing material 62A, the sound insulating plate material 80, and the second sound absorbing material 62B in this order from the axial downstream side Dad toward the axial upstream side Dau, and tip portions thereof are exposed to the axial upstream side Dau of the second sound absorbing material 62B. On the other hand, the fixing member 77 of the outer accommodating space 730 of the first frame 61A penetrates only the first sound absorbing material 62A, and a tip portion thereof is exposed to the axial upstream side Dau of the first sound absorbing material 62A.

As illustrated in FIGS. 3, 5, and 6, the fixing member 77 is disposed at a position away from the outer peripheral plate part 65 and the inner peripheral plate part 66. A plurality of the fixing members 77 are provided in each of the frames 61. In the fixing member 77 of the present embodiment, two fixing members 77 disposed at an interval in the circumferential direction Dc are used as a set. More specifically, each of the fixing members 77 penetrates each of the two through-holes 78 included in one sound absorbing material pressing member 76. A male screw (not illustrated) is formed in a tip portion of the fixing member 77 so that the nut 79 can be coupled. The nut 79 restricts displacement of the sound absorbing material pressing member 76 to the axial upstream side Dau. For example, the nut 79 may be locked by a tongued washer or a lock nut.

As illustrated in FIG. 3, in each of the frames 61, the number of sets of the fixing members 77 aligned in the circumferential direction Dc corresponds to the length dimension of the frame 61 in the circumferential direction Dc. The second frame 61B of the present embodiment is provided with one set of the fixing members 77 in the circumferential direction Dc, and the third frame portion and the fourth frame 61D are provided with two sets of the fixing members 77 in the circumferential direction Dc. The first frame 61A includes the outer accommodating space 730 and the inner accommodating space 73*i*, and includes two total sets of the fixing members 77, one set in each of the outer accommodating space 730 and the inner accommodating space 73*i*. However, in the first frame 61A as well, the number of sets of the fixing members 77 disposed at an interval in the circumferential direction Dc is one set.

<<Configuration of First Vibration Isolating Sheet>>

As illustrated in FIGS. 5 and 6, the first vibration isolating sheet 81A attenuates the vibration of the support plate part 64. The first vibration isolating sheet 81A covers an outer surface 64*a* of the support plate part 64 which faces the axial downstream side Dad serving as a counter-noise-source side in the axial direction Da. For example, the first vibration isolating sheet 81A is formed of a rubber sheet or a synthetic resin sheet. The first vibration isolating sheet 81A is fixed in a state of being close contact with the support plate part 64. For example, the first vibration isolating sheet 81A is fixed to the support plate part 64 by a plurality of fasteners 85 (refer to FIG. 7) such as bolts. The length dimension in the circumferential direction Dc of the first vibration isolating sheet 81A is equal to the length dimension in the circumferential direction Dc of the support plate part 64 of each of the frames 61 aligned in the circumferential direction Dc.

The first vibration isolating sheet 81A protrudes to the radial inner side Dri with respect to the support plate part 64. A portion protruding to the radial inner side Dri of the first vibration isolating sheet 81A is in contact with the gland flange 41 of the gland portion 40 or with the inner bellows portion flange 53 of the bellows portion 50. The length dimension in the radial direction Dr of the portion protruding to the radial inner side Dri of the first vibration isolating sheet 81A of the present embodiment is longer than the dimension of in the radial direction Dr of a gap between the inner peripheral plate part 66 and the inner bellows portion flange 53 or the gland flange 41, and the portion protruding to the radial inner side Dri of the first vibration isolating sheet 81A is elastically deformed and located further on the axial downstream side Dad the closer the portion is to the radial inner side Dri. That is, the first vibration isolating sheet 81A closes a gap 83 between the inner peripheral plate part 66 and the inner bellows portion flange 53 or the gland flange 41 from the axial downstream side Dad. The first vibration isolating sheet 81A of the present embodiment also protrudes to the radial outer side Dro with respect to the support plate part 64. A portion protruding to the radial outer side Dro of the first vibration isolating sheet 81A is in contact with the outer bellows portion flange 56*b* and the flange portion 54.

<<Configuration of Second Vibration Isolating Sheet>>

Figure 7:
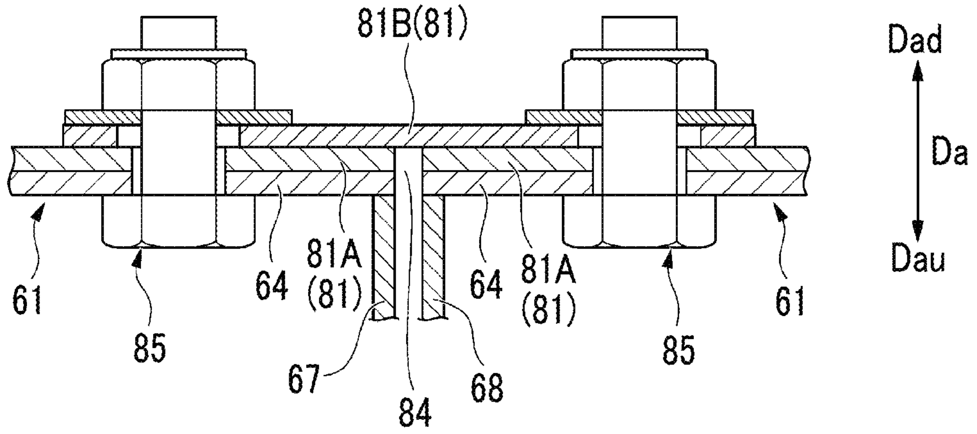
FIG. 7 is a sectional view illustrating the vicinity of a second vibration isolating sheet in the embodiment of the present disclosure.

FIG. 7 is a sectional view illustrating the vicinity of the second vibration isolating sheet in the embodiment of the present disclosure.

As illustrated in FIG. 7, the second vibration isolating sheet 81B closes a gap 84 of the frames 61 adjacent to each other in the circumferential direction Dc from the axial downstream side Dad. As in the first vibration isolating sheet 81A, the second vibration isolating sheet 81B is also formed of the rubber sheet or the synthetic resin sheet. For example, the second vibration isolating sheet 81B may be formed in any way as long as the second vibration isolating sheet 81B can close the gap 84, and may be formed to have a shorter length dimension in the circumferential direction Dc than that of the first vibration isolating sheet 81A. In addition, as in the first vibration isolating sheet 81A, the second vibration isolating sheet 81B may also be formed to protrude to the radial inner side Dri and the radial outer side Dro with respect to the support plate part 64.

<<Operational Effects>>

According to the above-described embodiment, while the sound absorbing material 62 accommodated in the sound absorbing material accommodating space 73 of the frame 61 is exposed to the axial upstream side Dau, the movement restricting member 63 can restrict the movement of the sound absorbing material to the axial upstream side Dau. In addition, the sound absorbing material pressing member 76 of the movement restricting member 63 comes into contact with the sound absorbing material 62 only at the position away from the outer peripheral plate part 65 and the inner peripheral plate part 66. Therefore, even when the sound absorbing material pressing member 76 vibrates due to the noise from the axial upstream side Dau, it is possible to prevent the vibration from being transmitted to the support plate part 64 via the outer peripheral plate part 65 and the inner peripheral plate part 66. In addition, according to the above-described embodiment, in addition to the above-described configuration, the sound absorbing material pressing member 76 comes into contact with the sound absorbing material 62 only at the position away from the first side plate part 67 and the second side plate part 68. Therefore, it is also possible to prevent the vibration of the sound absorbing material pressing member 76 from being transmitted to the support plate part 64 via the first side plate part 67 and the second side plate part 68. Therefore, soundproof performance of the soundproof wall 60 can be improved.

Furthermore, according to the above-described embodiment, the movement of the sound absorbing material 62 can be restricted only by attaching the sound absorbing material pressing member 76 to the fixing member 77 fixed to the support plate part 64. Therefore, the sound absorbing material 62 can be easily accommodated in the sound absorbing material accommodating space 73 or can be taken out from the sound absorbing material accommodating space 73. Therefore, a burden on an operator can be reduced when the sound absorbing material 62 is attached or detached.

In addition, according to the above-described embodiment, the first sound absorbing material 62A and the second sound absorbing material 62B which serve as the plurality of sound absorbing materials 62 are aligned and accommodated in the sound absorbing material accommodating space 73 in the axial direction Da, and the sound insulating plate material 80 is provided between the plurality of sound absorbing materials 62. Therefore, the noise from the axial upstream side Dau can be absorbed by the second sound absorbing material 62B, and thereafter, the noise can be reflected and attenuated by the sound insulating plate material 80. Furthermore, the noise transmitted from the sound insulating plate material 80 to the axial downstream side Dad can be absorbed by the first sound absorbing material 62A. Therefore, soundproof performance can be efficiently improved by the sound absorbing material 62 and the sound insulating plate material 80 which are accommodated in the sound absorbing material accommodating space 73 of the frame 61.

Furthermore, according to the above-described embodiment, the plurality of frames 61 are aligned in an annular shape in the circumferential direction Dc. Therefore, when the soundproof wall 60 is installed in the annular space 90, the frames 61 can be installed one by one to form the annular shape. Therefore, compared to when only one annular frame is installed, a weight corresponding to one frame 61 can be reduced, and the soundproof wall 60 can be easily attached and detached. Furthermore, when rotor balance is adjusted via the pipe 32, only the frame 61A needs to be removed, and the frame 61A can be easily removed since the frame 61A can have a smaller configuration.

In addition, adopting a structure of the first frame 61A is only necessary for the frame 61 for disposing the pipe 32. Therefore, it is possible to prevent complicated structures of the second frame 61B to the fourth frame 61D which are the other frames 61.

In addition, according to the above-described embodiment, the soundproof wall 60 is fixed only to the flange portion 54. Therefore, while the gland portion 40 and the casing 20 are sealed by the bellows portion 50, the noise caused by the bellows portion 50 can be prevented from being transmitted to the outside without hindering the relative displacement of the gland portion 40 and the casing 20 in the axial direction Da.

Furthermore, according to the above-described embodiment, the first vibration isolating sheet 81A covering the outer surface 64*a* of the support plate part 64 is provided. In this manner, the vibration of the support plate part 64 caused by the noise from the bellows portion 50 can be attenuated. Therefore, the soundproof performance can be further improved.

Furthermore, the first vibration isolating sheet 81A protrudes to the radial inner side Dri with respect to the support plate part 64, and is in contact with the gland flange 41 or the inner bellows portion flange 53. Therefore, the gap 83 between the inner peripheral plate part 66 and the gland flange 41 or the inner bellows portion flange 53 can be closed by the first vibration isolating sheet 81A. Therefore, it is possible to prevent the noise from being transmitted in the axial direction Da through the gap 83 between the inner peripheral plate part 66 and the gland flange 41 or the inner bellows portion flange 53. In addition, the first vibration isolating sheet 81A also protrudes to the radial outer side Dro, and comes into contact with the outer bellows portion flange 56*b* and the flange portion 54. Therefore, it is possible to prevent the noise from being transmitted in the axial direction Da from a portion between the outer peripheral plate part 65 and the outer bellows portion flange 56*b* or the flange portion 54 in the radial direction Dr.

Furthermore, according to the above-described embodiment, the gap 84 of the frames 61 adjacent to each other in the circumferential direction Dc is closed by the second vibration isolating sheet 81B from the axial downstream side Dad. Therefore, it is possible to prevent the noise from being transmitted in the axial direction Da through the gap 84.

In addition, according to the above-described embodiment, the soundproof wall 60 is fixed only to the protrusion portion 58 of the bellows portion 50. Therefore, the soundproof wall 60 can be attached to and detached from the flange portion 54 of the casing 20 in a state where the soundproof wall 60 is fixed to the bellows portion 50. Therefore, workability can be improved, compared to when the soundproof wall 60 is attached to the bellows portion 50 after the bellows portion 50 is fixed to the casing 20.

(Other Embodiments)

The present disclosure is not limited to the configuration of the above-described embodiment, and design can be changed within the scope not departing from the concept of the present disclosure.

For example, in the above-described embodiment, a case has been described where the soundproof wall 60 is installed in the annular space 90 on the outer peripheral side of the turbine rotor 11 of the steam turbine 5, that is, on the outer peripheral side of the gland portion 40 or on the outer peripheral side of the bellows body portion 51 and on the inner peripheral side of the second support portion 56 of the bellows support portion 52. However, an installation location of the soundproof wall 60 may be any annular space on the outer peripheral side of the rotary shaft rotatable around the axis, and is not limited to the case where the soundproof wall 60 is installed in the annular space 90 on the outer peripheral side of the turbine rotor 11 of the steam turbine 5, that is, on the outer peripheral side of the gland portion 40 or on the outer peripheral side of the bellows body portion 51 and on the inner peripheral side of the second support portion 56 of the bellows support portion 52.

In addition, in the above-described embodiment, a case where the plurality of frames 61 are provided has been described. However, one frame 61 formed in an annular shape may be provided.

Furthermore, in the above-described embodiment, the steam turbine 5 which is a two-way flow dividing exhaust type and a downward exhaust type has been described as an example, but the configuration of the steam turbine 5 is not limited to the above-described configuration.

In addition, in the above-described embodiment, a case where the sound absorbing material pressing member 76 is formed in a rod shape extending straight has been described as an example. However, a shape of the sound absorbing material pressing member 76 is not limited to the above-described rod shape extending straight as long as the displacement of the sound absorbing material 62 to the axial noise-source side can be restricted without coming into contact with the outer peripheral plate part 65, the inner peripheral plate part 66, the first side edge 71, and the second side edge 72. For example, the shape of the sound absorbing material pressing member 76 may be a flat plate shape.

Furthermore, in the above-described embodiment, a case where one sound absorbing material pressing member 76 is attached to the two fixing members 77 has been described. However, for example, one sound absorbing material pressing member 76 may be attached to one fixing member 77, or one sound absorbing material pressing member 76 may be attached to three fixing members 77 or more. In addition, a case has been described where the male screw is formed in the fixing member 77 and the nut 79 is screwed into the male screw to fix the sound absorbing material 62 or the sound insulating plate material 80. However, the configuration is not limited to the above-described shape as long as the fixing member 77 can penetrate the sound absorbing material 62 or the sound insulating plate material 80. That is, as long as the sound absorbing material pressing member 76 can be fixed to the fixing member 77, the embodiment is not limited to the configuration in which the sound absorbing material pressing member 76 is fixed by the nut 79.

In addition, in the above-described embodiment, a case has been described where the soundproof wall 60 is fixed to the protrusion portion 58 formed in the outer bellows portion flange 56*b* of the bellows portion 50. However, the soundproof wall 60 may be directly fixed to the flange portion 54 of the casing 20 without using the outer bellows portion flange 56*b*.

Furthermore, in the above-described embodiment, a case where the first vibration isolating sheet 81A and the second vibration isolating sheet 81B are provided has been described. However, the vibration isolating sheet 81 may be omitted depending on a required soundproof effect.

<Additional Notes>

The soundproof wall and the steam turbine which are described in the embodiments are understood as follows, for example.

(1) According to a first aspect, there is provided the soundproof wall 60 disposed in the annular space 90 on the outer peripheral side of the rotary shaft 11 rotatable around the axis Ar. The soundproof wall 60 includes the frame 61 disposed in the annular space 90, the sound absorbing material 62 supported by the frame 61, and the movement restricting member 63 that restricts the movement of the sound absorbing material 62 to the axial noise-source side Dau which is a side of the noise-source 51, out of both sides Dau and Dad in the axial direction Da in which the axis Ar extends. The frame 61 includes the support plate part 64 extending in the circumferential direction Dc around the axis Ar and spreading in the radial direction Dr around the axis Ar, the outer peripheral plate part 65 extending from the end on the outer side Dro in the radial direction Dr of the support plate 64 toward the axial noise-source side Dau and extending in the circumferential direction Dc, and the inner peripheral plate part 66 extending from the end on the inner side Dri in the radial direction Dr of the support plate part 64 toward the axial noise-source side Dau and extending in the circumferential direction Dc. The sound absorbing material 62 is accommodated in the sound absorbing material accommodating space 73 partitioned by the support plate part 64, the outer peripheral plate part 65, and the inner peripheral plate part 66. The movement restricting member 63 includes the sound absorbing material pressing member 76 that comes into contact with the sound absorbing material 62 only at the position away from the outer peripheral plate part 65 and the inner peripheral plate part 66, and that is relatively immovable with respect to the support plate part 64 in the axial direction Da.

Examples of the rotary shaft include the turbine rotor 11. Examples of the noise-source include the bellows body portion 51 that seals a portion between the gland portion 40 and the casing 20 of the steam turbine 5.

In this manner, even when the sound absorbing material pressing member 76 vibrates due to the noise from the axial noise-source side Dau, it is possible to prevent the vibration from being transmitted to the support plate part 64 via the outer peripheral plate part 65 and the inner peripheral plate part 66. Therefore, soundproof performance of the soundproof wall 60 can be improved.

(2) According to a second aspect of the soundproof wall 60, in the soundproof wall 60 of (1), the movement restricting member 63 further includes the fixing member 77 fixed to the support plate part 64, extending from the support plate part 64 toward the axial noise-source side Dau, and penetrating the sound absorbing material 62, and the sound absorbing material pressing member 76 is attached to the fixing member 77.

In this manner, the sound absorbing material 62 can be easily accommodated in the sound absorbing material accommodating space 73, and the sound absorbing material 62 can be easily taken out from the sound absorbing material accommodating space 73. Therefore, a burden on an operator can be reduced when the sound absorbing material 62 is attached or detached.

(3) According to a third aspect of the soundproof wall 60, in the soundproof wall 60 of (1) or (2), the plurality of sound absorbing materials 62 are aligned and accommodated in the sound absorbing material accommodating space 73 in the axial direction Da. The sound insulating plate material 80 extending in the circumferential direction Dc and spreading in the radial direction Dr is provided between the sound absorbing materials 62 adjacent to each other in the axial direction Da.

In this manner, the noise transmitted from the second sound absorbing material 62B to the first sound absorbing material 62A can be reflected and attenuated by the sound insulating plate material 80. Therefore, soundproof performance can be efficiently improved.

(4) According to a fourth aspect of the soundproof wall 60, in the soundproof wall 60 in any one of (1) to (3), the plurality of frames 61 annularly aligned in the circumferential direction Dc are provided.

In this manner, compared to when only one annular frame is installed, the weight per one frame 61 can be reduced, and the frame 61 can be easily attached and detached.

(5) According to a fifth aspect of the soundproof wall 60, in the soundproof wall 60 of (4), the frame 61 includes the first side plate part 67 extending from the end on the first side of the outer peripheral plate part 65 in the circumferential direction Dc to the inner side Dri in the radial direction Dr, connected to the end on the first side of the inner peripheral plate part 66 in the circumferential direction Dc, and connected to the end on the first side of the support plate part 64 in the circumferential direction Dc, and the second side plate part 68 extending from the end on the second side of the outer peripheral plate part 65 in the circumferential direction Dc to the inner side Dri in the radial direction Dr, connected to the end on the second side in the circumferential direction Dc of the inner peripheral plate part 66, and connected to the end on the second side of the support plate part 64 in the circumferential direction Dc. The sound absorbing material accommodating space 73 is formed by the support plate part 64, the outer peripheral plate part 65, the inner peripheral plate part 66, the first side plate part 67, and the second side plate part 68. The sound absorbing material pressing member 76 is in contact with the sound absorbing material 62 only at the position away from the outer peripheral plate part 65, the inner peripheral plate part 66, the first side plate part 67, and the second side plate part 68.

In this manner, when the frame 61 includes the first side plate part 67 and the second side plate part 68, it is possible to prevent the vibration of the sound absorbing material pressing member 76 from being transmitted to the support plate part 64 via the outer peripheral plate part 65, the inner peripheral plate part 66, the first side plate part 67, and the second side plate part 68. Therefore, soundproof performance of the soundproof wall 60 can be improved.

(6) According to a sixth aspect of the soundproof wall 60, the soundproof wall 60 in any one of (1) to (5) further includes the first vibration isolating sheet 81A that covers the outer surface 64*a* of the support plate part 64 which faces the counter-noise-source side Dad opposite to the axial noise-source side Dau in the axial direction Da.

In this manner, the vibration of the support plate part 64 can be attenuated. Therefore, the soundproof performance can be further improved.

(7) According to a seventh aspect of the soundproof wall 60, the soundproof wall 60 of (4) or (5) further includes the first vibration isolating sheet 81A that covers the outer surface 64*a* of the support plate part 64 which faces the counter-noise-source side Dad opposite to the axial noise-source side Dau in the axial direction Da, and the second vibration isolating sheet 81B that closes the gap 84 of the support plate parts 64 adjacent to each other in the circumferential direction Dc from the counter-noise-source side Dad.

In this manner, the vibration of the support plate part 64 can be attenuated by the first vibration isolating sheet 81A, and the noise can be prevented from being transmitted from the axial noise-source side Dau to the counter-noise-source side Dad through the gap 84 by the second vibration isolating sheet 81B.

(8) According to an eighth aspect, there is provided the steam turbine 5 including the steam turbine rotor 11 rotatable around the axis Ar, the steam turbine casing 20 disposed on the outer peripheral side of the steam turbine rotor 11, the gland portion 40 that seals the periphery of the steam turbine rotor 11, the bellows portion 50 that closes the portion between the gland portion 40 and the steam turbine casing 20 while allowing the relative displacement between the gland portion 40 and the steam turbine casing 20 in the axial direction Da in which the axis Ar extends, and the soundproof wall 60 in any one of (1) to (5), which is disposed in the annular space 90 on the outer peripheral side Dro of the steam turbine rotor 11 serving as the rotary shaft 11.

In this manner, the noise generated from the bellows portion 50 by the steam ejected from the gland portion 40 can be efficiently reduced.

(9) According to a ninth aspect of the steam turbine 5, in the steam turbine 5 of (8), the annular space 90 is formed between the gland portion 40 and the steam turbine casing 20 in the radial direction Dr. The bellows portion 50 includes the bellows body portion 51 connected to the gland portion 40 and extending in the axial direction Da, and the bellows support portion 52 extending to the outer peripheral side Dro from the end of the bellows body portion 51 which is the opposite side Dau to the gland portion 40 and connected to the flange portion 54 of the steam turbine casing 20. The soundproof wall 60 is supported only from the outer peripheral side Dro in the radial direction Dr.

In this manner, the soundproof wall 60 can be prevented from hindering the movement of the bellows portion 50, and the soundproof wall 60 is easily attachable and detachable.

(10) According to a tenth aspect of the steam turbine 5, the steam turbine 5 of (9) further includes the first vibration isolating sheet 81A that covers the outer surface 64*a* of the support plate part 64 which faces the counter-noise-source side Dad opposite to the axial noise-source side Dau in the axial direction Da. The inner peripheral plate part 66 of the frame 61 is separated from the gland portion 40 and the bellows portion 50 in the radial direction Dr. The first vibration isolating sheet 81A is in contact with the gland portion 40 or the bellows portion 50.

Examples of the gland portion 40 include the gland flange 41. Examples of the bellows portion 50 include the inner bellows portion flange 53 for fixing the bellows body portion 51 to the gland flange 41.

In this manner, the gap between the inner peripheral plate part 66 and the gland flange 41 or the inner bellows portion flange 53 can be closed by the first vibration isolating sheet 81A. Therefore, it is possible to prevent the noise from being transmitted to the counter-noise-source side Dad through the gap between the inner peripheral plate part 66 and the gland flange 41 or the inner bellows portion flange 53.

(11) According to an eleventh aspect of the steam turbine 5, the steam turbine 5 of (9) or (10) further includes the first vibration isolating sheet 81A that covers the outer surface 64*a* of the support plate part 64 which faces the counter-noise-source side Dad opposite to the axial noise-source side Dau in the axial direction Da. The first vibration isolating sheet 81A is in contact with the inner peripheral side of the inner casing 21 of the steam turbine casing 20.

In this manner, it is possible to prevent the noise from being transmitted in the axial direction Da from the portion between the outer peripheral plate part 65 and the outer bellows portion flange 56*b* or the flange portion 54 in the radial direction Dr.

INDUSTRIAL APPLICABILITY

According to the above-described soundproof wall and the above-described steam turbine, soundproof performance can be improved.

REFERENCE SIGNS LIST

5: Steam turbine
10*a*: First steam turbine unit
10*b*: Second steam turbine unit
11: Turbine rotor
12: Rotor shaft
12*a*: Inner surface
13: Rotor blade row
17: Stator blade row
18: Bearing
19: Steam inlet duct
20: Casing
21: Inner casing
21*s*: First space
26: Diffuser
26*s*: Diffuser space
27: Outer diffuser
29: Inner diffuser
30: Outer casing
30*s*: Second space
31: Exhaust port
32: Pipe
40: Gland portion
41: Gland flange
50: Bellows portion
51: Bellows body portion
51*u*: End portion
52: Bellows support portion
53: Inner bellows portion flange
54: Flange portion
55: First support portion
550: End portion
56: Second support portion
56*d*: End portion
56*b*: Outer bellows portion flange
57: Fastener
58: Protrusion portion
60: Soundproof wall
61: Frame
61A: First frame
61B: Second frame
61C: Third frame
61D: Fourth frame
62: Sound absorbing material
63: Movement restricting member
64: Support plate part
64*a*: Outer surface
65: Outer peripheral plate part
66: Inner peripheral plate part
67: First side plate part
68: Second side plate part
69: Outer peripheral edge
70: Inner peripheral edge
71: First side edge
72: Second side edge
73: Sound absorbing material accommodating space

74: Partition plate part
76: Sound absorbing material pressing member
77: Fixing member
78: Through-hole
80: Sound insulating plate material
81: Vibration isolating sheet
81A: First vibration isolating sheet
81B: Second vibration isolating sheet
83, 84: Gap
85: Fastener
90: Annular space

The invention claimed is:

1. A soundproof wall disposed in an annular space on an outer peripheral side of a rotary shaft rotatable around an axis, the soundproof wall comprising:
a frame disposed in the annular space;
a sound absorbing material supported by the frame; and
a movement restricting member that restricts movement of the sound absorbing material to an axial noise-source side which is a side of a noise-source, out of both sides in an axial direction in which the axis extends,
wherein the frame includes
a support plate part extending in a circumferential direction around the axis and spreading in a radial direction around the axis,
an outer peripheral plate part extending from an outer end of the support plate part in the radial direction toward the axial noise-source side and extending in the circumferential direction, and
an inner peripheral plate part extending from an inner end of the support plate part in the radial direction toward the axial noise-source side and extending in the circumferential direction,
the sound absorbing material is accommodated in a sound absorbing material accommodating space partitioned by the support plate part, the outer peripheral plate part, and the inner peripheral plate part, and
the movement restricting member includes a sound absorbing material pressing member that comes into contact with the sound absorbing material only at a position away from the outer peripheral plate part and the inner peripheral plate part such that the sound absorbing material pressing member has no direct connection with the outer peripheral plate part and the inner peripheral plate part, and the sound absorbing material pressing member is relatively immovable with respect to the support plate part in the axial direction.

2. The soundproof wall according to claim 1,
wherein the movement restricting member further includes
a fixing member fixed to the support plate part, extending from the support plate part toward the axial noise-source side, and penetrating the sound absorbing material, and
the sound absorbing material pressing member is attached to the fixing member.

3. The soundproof wall according to claim 1,
wherein a plurality of the sound absorbing materials are aligned and accommodated in the sound absorbing material accommodating space in the axial direction, and
a sound insulating plate material extending in the circumferential direction and spreading in the radial direction is provided between the sound absorbing materials adjacent to each other in the axial direction.

4. The soundproof wall according to claim 1,
wherein a plurality of the frames annularly aligned in the circumferential direction are provided.

5. The soundproof wall according to claim 4,
wherein the frame includes
a first side plate part extending from an end on a first side of the outer peripheral plate part in the circumferential direction to an inner side in the radial direction, connected to an end on a first side of the inner peripheral plate part in the circumferential direction, and connected to an end on a first side of the support plate part in the circumferential direction, and
a second side plate part extending from an end on a second side of the outer peripheral plate part in the circumferential direction to an inner side in the radial direction, connected to an end on a second side of the inner peripheral plate part in the circumferential direction, and connected to an end on a second side of the support plate part in the circumferential direction,
the sound absorbing material accommodating space is formed by the support plate part, the outer peripheral plate part, the inner peripheral plate part, the first side plate part, and the second side plate part, and
the sound absorbing material pressing member is in contact with the sound absorbing material only at a position away from the outer peripheral plate part, the inner peripheral plate part, the first side plate part, and the second side plate part.

6. The soundproof wall according to claim 5, wherein
the sound absorbing material pressing member is in contact with the sound absorbing material only at the position away from the outer peripheral plate part, the inner peripheral plate part, the first side plate part, and the second side plate part such that the sound absorbing material pressing member has no direct connection with the first side plate part and the second side plate part.

7. The soundproof wall according to claim 4, further comprising:
a first vibration isolating sheet that covers an outer surface of the support plate part which faces a counter-noise-source side opposite to the axial noise-source side in the axial direction; and
a second vibration isolating sheet that closes a gap of the support plate parts adjacent to each other in the circumferential direction from the counter-noise-source side.

8. The soundproof wall according to claim 1, further comprising:
a first vibration isolating sheet that covers an outer surface of the support plate part which faces a counter-noise-source side opposite to the axial noise-source side in the axial direction.

9. A steam turbine comprising:
a steam turbine rotor rotatable around an axis;
a steam turbine casing disposed on an outer peripheral side of the steam turbine rotor;
a gland portion that seals a periphery of the steam turbine rotor;
a bellows portion that closes a portion between the gland portion and the steam turbine casing while allowing a relative displacement between the gland portion and the steam turbine casing in the axial direction in which the axis extends; and the soundproof wall according to claim 1, which is disposed in an annular space on the outer peripheral side of the steam turbine rotor serving as a rotary shaft.

10. The steam turbine according to claim 9, wherein the annular space is formed between the gland portion and the steam turbine casing in the radial direction, the bellows portion includes a bellows body portion connected to the gland portion and extending in the axial direction, and a bellows support portion extending to an outer peripheral side from an end of the bellows body portion which is opposite to the gland portion and connected to a flange portion of the steam turbine casing, and the soundproof wall is supported only from an outer side of the bellows support portion in the radial direction.

11. The steam turbine according to claim 10, further comprising:

a first vibration isolating sheet that covers an outer surface of the support plate part which faces a counter-noise-source side opposite to the axial noise-source side in the axial direction, wherein the inner peripheral plate part of the frame is separated from the gland portion and the bellows portion in the radial direction, and the first vibration isolating sheet is in contact with the gland portion or the bellows portion.

12. The steam turbine according to claim 10, further comprising:

a first vibration isolating sheet that covers an outer surface of the support plate part which faces a counter-noise-source side opposite to the axial noise-source side in the axial direction, wherein the first vibration isolating sheet is in contact with an inner peripheral side of an inner casing of the steam turbine casing.

* * * * *